Dec. 18, 1934.   J. H. McELROY   1,984,890
SHEET FEEDING APPARATUS
Filed June 29, 1928   3 Sheets-Sheet 1

INVENTOR
John H. McElroy
by
Cameron, Kerkam & Sutton
ATTORNEYS

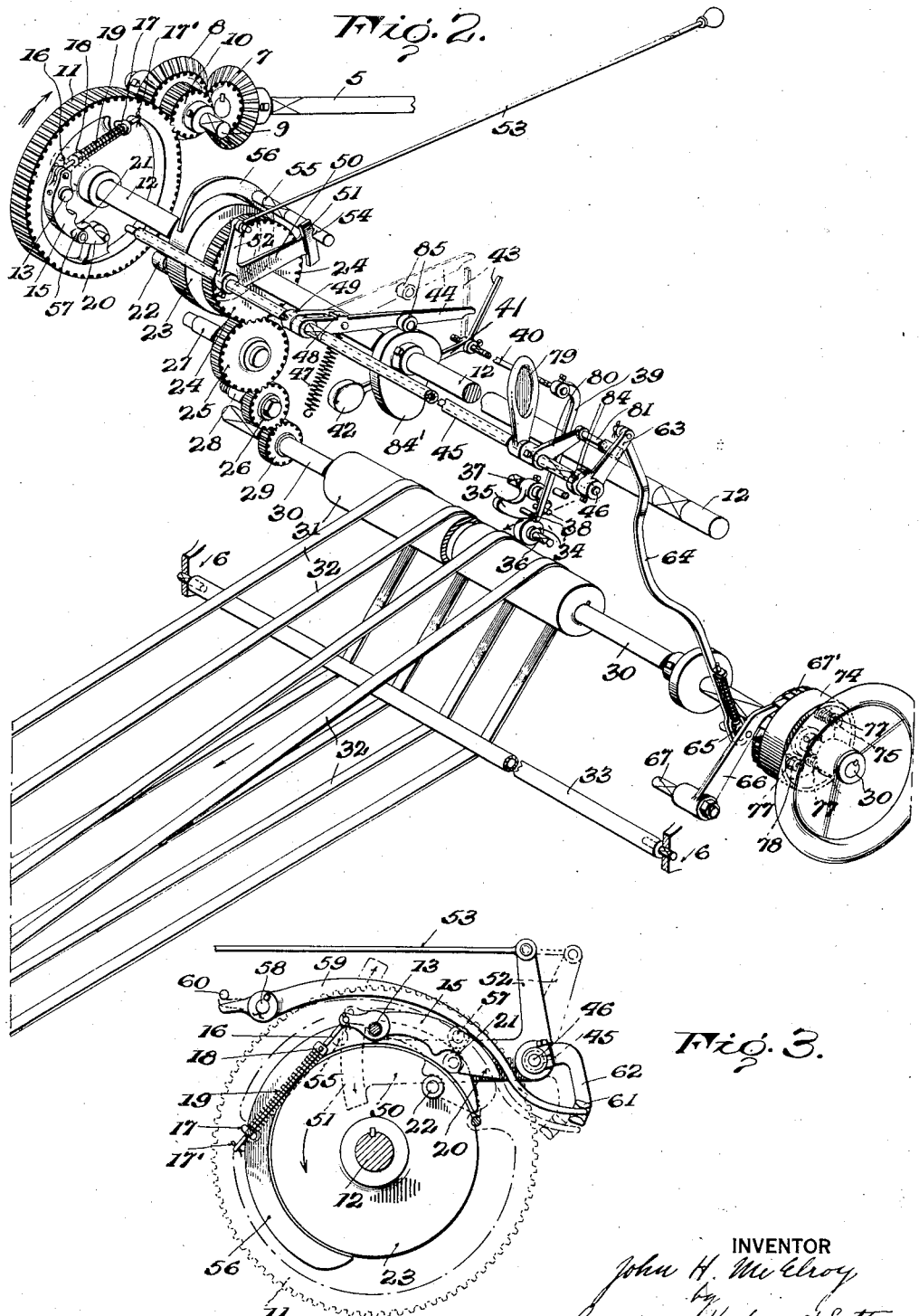

Dec. 18, 1934.   J. H. McELROY   1,984,890
SHEET FEEDING APPARATUS
Filed June 29, 1923   3 Sheets-Sheet 3
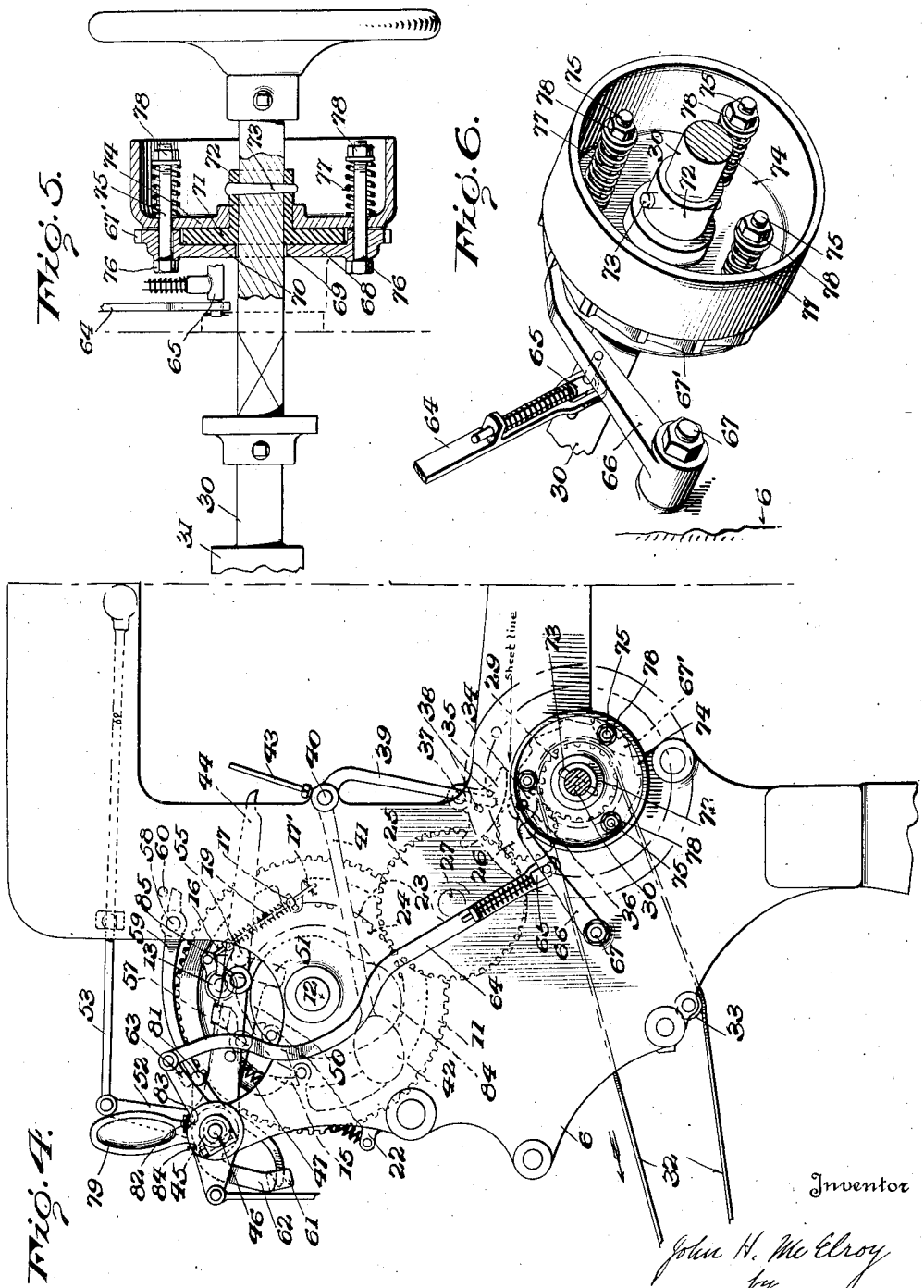

Patented Dec. 18, 1934

1,984,890

UNITED STATES PATENT OFFICE 1,984,890

SHEET FEEDING APPARATUS

John H. McElroy, Pearl River, N. Y., assignor to Dexter Folder Company, New York, N. Y., a corporation of New York Application June 29, 1928, Serial No. 289,281

13 Claims. (Cl. 192—126)

This invention relates to sheet feeding apparatus or the like and more particularly to brakes therefor which are employed to stop moving parts of the apparatus.

One object of the invention is to provide an improved brake which, when movable parts of the sheet feeder are disconnected from driving means therefor, promptly retards and stops said parts without exerting undue strain thereon.

Another object of the invention is to provide, in conjunction with the feeder clutch and operating mechanism therefor, improved brake operating devices which, when the clutch is disconnected by said mechanism, acts to stop the movement of parts of the feeder that are driven from a source of power through said clutch.

Another object of the invention is to provide an improved brake mechanism connected with sheet calipering devices of the sheet feeder so as to be automatically controlled by said devices.

A further object of the invention is to provide a simply constructed, highly efficient brake mechanism which can be readily installed, and maintained in operation with minimum attention by the operative.

Other objects of the invention will appear as the following description thereof proceeds.

In order to more clearly understand the invention reference may be had to the accompanying drawings which illustrate one embodiment of the inventive idea and wherein:

Fig. 2 is a detailed perspective view of said brake mechanism and the clutch with parts of the former omitted and parts of the latter separated for purposes of clearer illustration;

Fig. 3 is an enlarged vertical sectional view on the line 3—3 of Fig. 1;

Fig. 4 is a vertical sectional view on the line 4—4 of Fig. 1;

Fig. 5 is an enlarged horizontal sectional view of the brake proper; and

Fig. 6 is an enlarged detail perspective view of said brake and a pawl and ratchet mechanism for operating the same.

Figure 1:
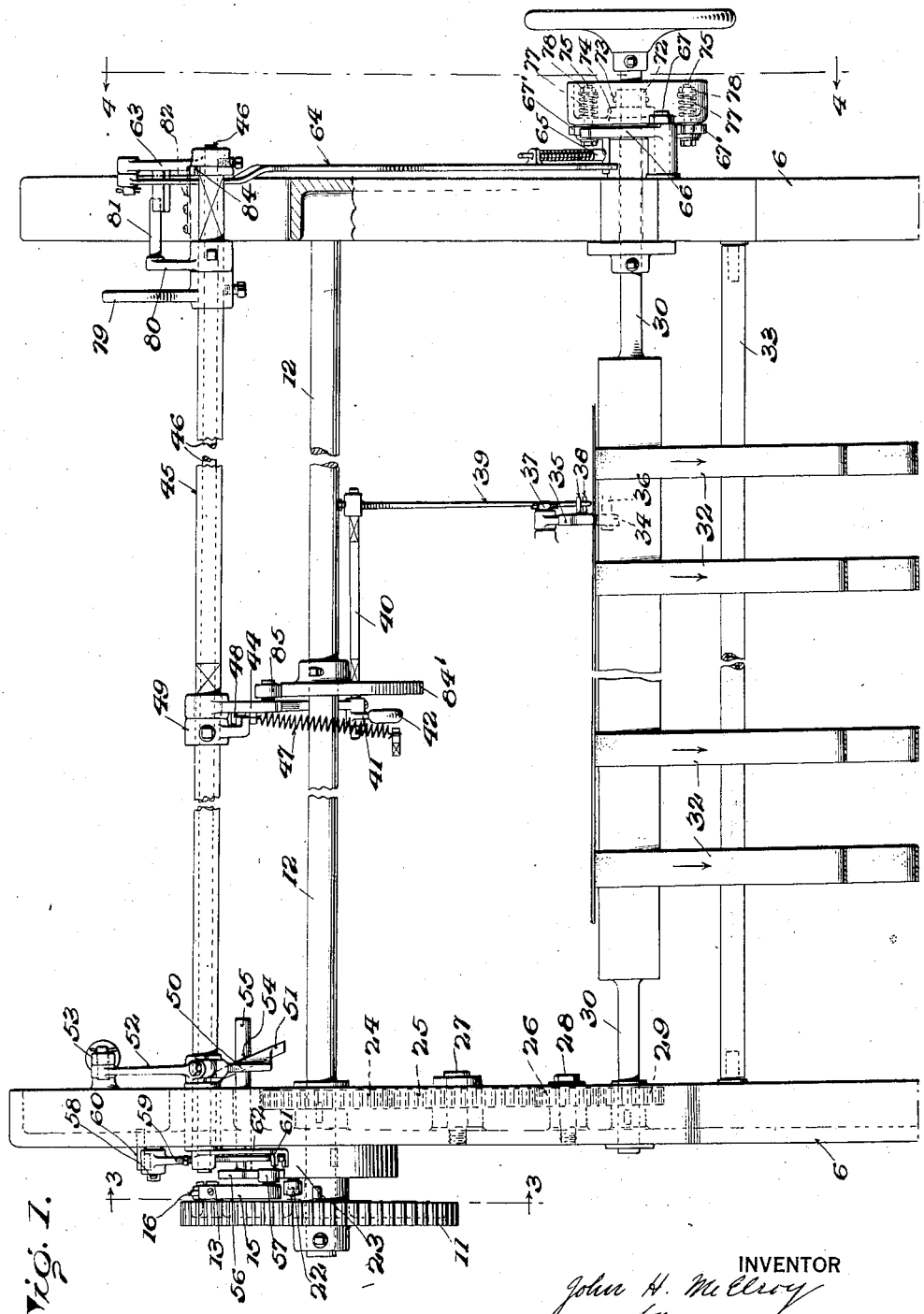
Fig. 1 is a fragmentary end view with parts omitted, of a sheet feeder including a clutch and equipped with brake mechanism embodying the present invention.

Referring to the drawings, wherein like reference characters designate like parts throughout the several views, 5 indicates a shaft driven from any suitable source of power (not shown) and journaled in suitable bearings on one of a pair of side frames 6, 6 of a sheet feeder (Figs. 1 and 2). Fixed on one end of the shaft 5 is a bevel gear 7 which meshes with a bevel gear 8 that is fixed on a stub shaft 9 journaled in suitable bearings on one of said side frames. This stub shaft 9 has rigidly secured thereon a spur pinion 10 that meshes with a large spur gear 11 which is loosely mounted on one extremity of a shaft 12 that extends transversely of the machine and is journaled in suitable bearings in the side frames 6, 6 thereof.

Pivoted, as at 13, on the gear 11, is a pawl 15 the tail of which is pivotally connected with one end of a rod 16. The opposite end of said rod passes through a screw-eye 17 carried by the gear 11 and is provided with a cotter pin 17' to normally prevent withdrawal of the rod from said screw-eye. Interposed between the screw-eye 17 and an adjusting nut 18 on the rod 16, is a coil spring 19 which is carried by said rod and normally tends to swing the nose 20 of pawl 15 toward the axis of the gear 11. The pawl 15 is provided, between the pivot 13 and the nose 20, with a depression 21 which is adapted to be engaged over a roller 22 journaled on a clutch disk 23 that is fixed on the shaft 12. According to Fig. 2, the gear carried pawl 15, the roller carrying disk 23, and a cam 56 and operating means therefor, are shown separated for purposes of clearer illustration. In actual practice, however, said parts are arranged relatively close to each other so that the pawl 15 may engage the roller 22, and the cam 56 may be moved into and out of the path of travel of a roller 57 on said pawl. It will appear from the foregoing that when the clutch comprised by pawl 15, roller 22 and disk 23, is connected, the shaft 12 will be driven by the above described gearing.

Fixed on the shaft 12 is a spur gear 24 that meshes with an idler gear 25 which in turn meshes with an idler gear 26. The idler gears 25 and 26 are fixed on stub-shafts 27 and 28, respectively, which are journaled in suitable bearings on one of the side frames 6, 6. The idler gear 26 meshes with a spur gear 29 that is fixed on a shaft 30 which extends transversely of the machine and is journaled in suitable bearings on the side frames 6, 6 thereof. This shaft 30 carries a feed roller 31 which drives a sheet conveyor including tapes 32 that pass around the roller 31 and also around a roller 33 that is journaled in suitable bearings on the side frames 6, 6.

This conveyor 32 serves to carry sheets fed successively thereto by suitable mechanism not shown, and to deliver the successive sheets forwardly to any desired instrumentality as, for example, the front stops of a printing press. Prior to the arrival of each sheet at the conveyor 32, it passes between the lower and upper elements 34 and 35 of a sheet calipering device. This calipering device acts, when more than one sheet at a time is fed through said elements, to operate mechanism for automatically disconnecting the clutch 15, 22, 23 and for automatically applying a brake which is hereinafter described.

The lower element 34 of the calipering device consists of a roller that is fixed on a stub shaft 36 journaled in suitable bearings on the machine framework. The upper element 35 of the calipering device comprises a segment which is fixed on a stub shaft 37 which is also journaled in suitable bearings on a stationary part of the machine framework. The caliper segment 35 is provided at one side thereof with a pair of spaced pins 38, 38 that engage loosely over the lower end of a lever 39 that is fixed on one extremity of a rock shaft 40 journaled in suitable bearings on a stationary part of the machine. The opposite extremity of the rock shaft 40 has fixed thereon a bell crank, one arm 41 of which is provided with a weight 42 that normally tends to hold the other arm or detent 43 of said bell crank in engagement with the free end of an arm 44. The arm 44 is loose on a tube 45 that is rotatably mounted on a clutch throw-out shaft 46 that extends transversely of the machine and serves to operate the brake above referred to.

When more than one sheet at a time is fed through the calipering device, the segment 35 is turned in a clockwise direction to engage the rearmost of the pins 38, 38 with the arm 39 which is thereby rotated in the same direction so that the detent comprised by bell crank arm 43 is disengaged from the arm 44 which is then moved downwardly under the action of a spring 47. Upon the downward movement of the arm 44 a projection 48 thereon engages with a short arm 49 that is fixed on the tube 45. The tube 45 is thus rotated in a clockwise direction about the throw-out shaft 46 and causes like motion to be imparted to a bell crank that is fixed on said tube. One arm 50 of this bell crank is provided at the free end thereof with a cam 51 and the other arm 52 of said bell crank is secured to a hand operated rod 53 by which the bell crank and the parts connected therewith may be manually operated if desired. The cam 51 is engaged in a cam slot 54 formed in one end of a rod 55 that is arranged for longitudinal movement in suitable bearings on one of the side frames 6, 6. The opposite end of the rod 55 has fixed thereon a crescent-shaped cam 56 which, when cam 51 is moved downwardly, is moved into the path of travel of a roller 57 journaled on the pawl 15. Downward movement of the cam 51 is obtained by rotation of the tube 45 in a clockwise direction, and said movement of the cam through engagement thereof with the cam slot 54, moves the rod 55 to bring the cam 56 into the path of travel of the roller 57.

When the cam 56 is brought into the path of the roller 57, the latter rides over said cam which thereby swings the pawl 15 away from the axis of the gear 11 and prevents engagement of said pawl with the roller 22 of disk 23. The clutch is thus disconnected so that it no longer drives the shaft 12 and parts driven thereby. When the clutch is disconnected, as above described, a brake of the present invention is automatically applied to retard and stop the operation of the parts driven by said clutch. This brake, and the operating mechanism therefor, are preferably comprised by the following instrumentalities.

Pivoted at 58 on one of the side frames 6, 6 of the machine, is a curved arm 59 one end of which is adapted to engage a stop pin 60 that limits the downward movement of said arm. The opposite end of the arm 59 is engaged in the laterally forked extremity 61 of an arm 62 that is fixed on one end of the throw-out shaft 46. When the clutch is disconnected, and during rotation of the pawl 15 with the gear 11, the roller 57, as it rides over the cam 56 engages the underside of the curved arm 59 and lifts the latter to the full line position thereof shown in Fig. 3 of the drawings. The arm 62 is thus swung upwardly whereby the throw-out shaft 46 is turned in a clockwise direction as viewed in Figs. 1, 2 and 4 of the drawings. Fixed on the end of the rock shaft 46 opposite that carrying the arm 62 is an arm 63 which, when the throw-out shaft 46 is rotated as described, is moved downwardly. Pivotally connected with the arm 63 and movable downwardly therewith is a link 64 which carries on its lower end a spring-pressed block 65 that is pivotally connected with a pawl 66. This pawl 66 is pivoted on a stud 67 carried by one of the machine side frames 6, 6. When the link 64 is moved downwardly by the arm 63 and the throw-out shaft 46, the nose of the pawl 66 is engaged with a ratchet 67' that is secured to or formed integrally with a plate 68 provided centrally thereof with an opening 69 through which the feed roller shaft 30 loosely extends. This plate 68 is provided with a recess 70 for a plate 71 having formed integrally therewith a sleeve 72 that is fixed on the shaft 30 by a pin 73 which passes through suitable aligned openings in said shaft and said sleeve. Mounted loosely on the sleeve 72 is a cup-shaped plate 74 which, together with the plate 68 has frictional engagement with the plate 71 through the medium of spring-pressed bolts 75, 75. The bolts 75, 75 pass through suitable aligned openings in the plates 68 and 74, the heads 76 of said bolts bearing against the outer face of the plate 68. The springs for the bolts 75 are indicated at 77 and are carried on the bolts between the plate 74 and adjusting nuts 78 that are threaded on the shanks of said bolts so that the tension of the springs 77 and the frictional engagement between the several plates may be adjusted as desired.

In the normal operation of the machine, the brake comprised by the plates 68, 71 and 74 rotates with the feed roller shaft 30. When the pawl 66 is engaged with the ratchet 67', as above described, rotation of the plates 68 and 74 is stopped so that they exert a braking action on the plate 71 to retard and stop the movement of the unclutched shaft 30 and all the parts connected therewith.

When the extra sheet or sheets have been removed from the caliper 34, 35, the clutch may be connected and the brake released, by pushing the rod 53 forwardly or by imparting like motion to a lever 79 that is fixed on the tube 45. The tube 45 is thus rotated in a counterclockwise direction as viewed in Fig. 2 and acts to release the brake and connect the clutch in the following manner. Fixed on the tube 45 adjacent the lever 79 is an arm 80 the free end of which is provided with a laterally projecting pin 81 that extends under the arm 63. When the tube 45 is rotated to disconnect the clutch and apply the brake, the pin 81 is lowered and has no affect on the arm 63. When the tube 45 is rotated to release the brake and connect the clutch, the pin 81 lifts the arm 63 thereby disengaging the pawl 66 from the ratchet 67' so that the brake is released and the parts thereof are free to rotate together with the shaft 30. When the brake is thus released, the arm 63 and parts connected therewith return to their full line positions indicated in the drawings. This arm 63 is preferably retained against accidental displacement from its raised and lowered positions by a leaf spring 82 (Fig. 1) secured to one of the side frames 6, 6 and provided at the free end thereof with a lug 83 that engages either of a pair of notches 84 formed on the hub of the arm 63 as clearly shown in Fig. 4 of the drawings. When the tube 45 is rotated to release the brake, the cam 51 is lifted and moves the rod 55 together with cam 56 to the right as viewed in Fig. 2. The cam 56 is thus moved out of the path of travel of the pawl 15 which, through the action of the spring 19, is then connected with the roller 22 of disk 23 so that shaft 12 and the parts connected therewith are driven as before, from the shaft 5. Fixed on the shaft 12 is a cam 84' which is adapted to engage a roller 85 that is journaled on the arm 44. When the brake is released and the clutch connected to driveshaft 12, the arm 44, which was previously moved downwardly by the spring 47 on operation of the caliper mechanism, is lifted by the high part of cam 84' through its engagement with the roller 85. When the arm 44 is thus lifted, the weight 42 moves downwardly, thereby swinging the bell crank arm 43 into engagement with the free end of the arm 44 to hold the latter in its uppermost dotted line position shown in Fig. 2. The cam 84' will then continue to rotate idly and the upper caliper member 35 will be returned to its normal position by the rearward movement of arm 39 imparted thereto when the weight 42 drops. The operation of the apparatus will be clearly understood from the foregoing, and may be briefly summarized as follows. When the clutch members 15, 22 are engaged, motion is imparted therethrough from shaft 5 to the sheet feeding or advancing means comprised by feed roller 31 and tapes 32. The caliper element 35 is set above the roller 36 a distance enabling only one sheet at a time, or a sheet of predetermined thickness, to pass from the source of supply between said element and said roller to the sheet feeding or advancing means.

While normal feeding or operation proceeds, the pawl 66 is held out of engagement with ratchet 67' and the brake 70, 71, 74 (Fig. 5) is ineffective and rotates with the shaft 30 of roller 31. If two or more sheets are fed at the same time between caliper element 35 and roller 36, or a sheet of more than predetermined thickness is fed therebetween, caliper element 35 is swung clockwise (Fig. 2) and acts, through the connections therefor with detent 43, to disengage the latter from arm 44. The low part of the cam 84' then enables the spring 47 to move arms 44 and 49 downwardly and thus, through the connections for arm 49 with cam 56, move said cam laterally into the path of travel of roller 57, thereby disengaging clutch parts 15, 22.

The rotating clutch part 15 is thus swung outwardly through travel of its roller 57 on cam 56, and actuates mechanism 59, 62, 46, 64 (Figs. 2 and 3) to engage pawl 66 with ratchet 67' and stop rotation of brake parts 70, 74. Frictional braking action is thus produced by said brake parts on the part 71, whereupon the shaft 30, roller 31, and tapes 32 are immediately stopped and prevented from moving further. When the trouble has been remedied (and also in the case of initial starting) the rod 53 or the handle 79 will be moved forwardly to rotate tube 45 and arm 80 counter-clockwise (Fig. 2), thus moving pin 81, arm 63 and rockshaft 46 in the same direction, and moving cam 56 laterally out of the path of travel of roller 57 of clutch part 15. At the same time the mechanism 59, 62, 46, 64 is actuated by tube 45 to lift pawl 66 and render the brake ineffective, and the spring 19 is enabled to swing the rotating clutch part 15 inwardly so that it may reengage clutch part 22 and thus connect the sheet advancing means with the driving means 5.

When the clutch parts 15, 22 are connected, the cam 84' raises arm 44 enabling weight 42 to reengage detent 43 with the last named arm, swing the other parts connected with said weight, and reset the caliper element 35. It is obvious that the clutch parts 15, 22 may be disengaged and the brake applied manually, by moving the rod 53 or the handle 79 rearwardly (Fig. 2). In this case, the arm 49 moves downwardly but the arm 44 is retained against downward movement by the detent 43 and tripping of the caliper mechanism is thus prevented.

It will appear from the foregoing, that the brake of the present invention may be applied automatically, as by the operation of the sheet calipering device, and that said brake may also be applied manually by the devices for releasing the brake. Moreover, the present brake in addition to its use in sheet feeding apparatus, is also adapted for use in any machine or instrumentality where the use of brakes is desirable. Therefore, while one embodiment of the inventive idea is particularly described and illustrated herein, it is to be expressly understood that the invention is not limited to such embodiment or otherwise than by the terms of the appended claims.

What is claimed is:

1. In sheet feeding apparatus, sheet advancing means, driving means therefor, a clutch for connecting and disconnecting said means, clutch operating mechanism, a rockshaft movable by said clutch operating mechanism through the clutch, a brake for the sheet advancing means, and devices operated by said rockshaft adapted to automatically apply the brake when the sheet advancing means is disconnected from its driving means.

2. In sheet feeding apparatus, sheet advancing means, driving means therefor, a clutch for connecting and disconnecting said means, a brake for the sheet advancing means adapted to be applied when the clutch parts are disengaged and released when said parts are engaged, mechanism for engaging and disengaging the clutch parts, a rockshaft controlled by said mechanism through said clutch, and brake applying and releasing means connected with the rockshaft and movable thereby into and out of engagement with a part of the brake.

3. In a sheet feeding apparatus, sheet advancing means including a roller, driving means therefor, a clutch interposed between the driving means and the sheet advancing means, mechanism adapted to separate parts of the clutch and thereby disconnect the sheet advancing means from its driving means, a rockshaft, means for rocking said shaft adapted to be operated by one part of the clutch when the other part is separated therefrom, a brake for the roller of the sheet advancing means, and means connected with the rockshaft adapted to apply said brake and stop further movement of said sheet advancing means when the latter is disconnected from said driving means.

4. In a sheet feeding apparatus, sheet advancing means including a roller, driving means therefor, a clutch interposed between the driving means and the sheet advancing means, a tubular element, means for rocking said tubular element, mechanism operated by the tubular element adapted to separate parts of the clutch and thereby disconnect the sheet advancing means from its driving means, a rockshaft extending through the tubular element, means for rocking said shaft adapted to be operated by one part of the clutch when the other part is separated therefrom, a brake for the feed roller, and means connected with the rockshaft adapted to apply said brake and stop further movement of said sheet advancing means when the latter is disconnected from said driving means.

5. In apparatus of the character described, sheet feeding means comprising a roller, means for driving the sheet feeding means including a clutch having parts engaged to connect said means and disengaged to disconnect the same, means for engaging and disengaging the clutch parts, a brake for the roller, and mechanism between the brake and the clutch for rendering the brake effective, said mechanism being actuated by one of the clutch parts when said parts are disengaged by said last named means.

6. In apparatus of the character described, sheet feeding means, a brake therefor, means for driving the sheet feeding means including a clutch having parts engaged to connect said means and disengaged to disconnect the same, sheet controlled means for disengaging the clutch parts, and movable interconnected devices between the brake and the clutch for rendering the brake effective, said devices being actuated by one of the clutch parts when said parts are disengaged by said sheet controlled means.

7. In apparatus of the character described, sheet feeding means, a brake therefor, means for driving the sheet feeding means including a clutch having parts engaged to connect said means and disengaged to disconnect the same, mechanism for engaging and disengaging the clutch parts, means for actuating said mechanism including a sheet caliper, and interconnected devices between the brake and the clutch for rendering the brake effective, said devices being actuated by one of the clutch parts when said parts are disengaged by said mechanism.

8. In apparatus of the character described, sheet feeding means, a brake therefor, mechanism for rendering the brake effective and ineffective, means for driving the sheet feeding means including a clutch having a part movable in one direction to connect said means and movable in the opposite direction to disconnect the same, actuate said mechanism and render the brake effective, automatically operated means for moving the clutch part in the last named direction, and manually operated means for moving said clutch part in the other direction and actuating said mechanism to render said brake ineffective.

9. In apparatus of the character described, sheet feeding mechanism, a brake therefor, driving mechanism for the sheet feeding mechanism and including a clutch, automatically operated means adapted to move a part of the clutch and disconnect said mechanisms, devices actuated by the clutch part upon movement thereof as aforesaid and rendering the brake effective, and manually operated means for moving said clutch part and actuating said devices to connect said mechanisms and render said brake ineffective 10. In apparatus of the character described, sheet feeding mechanism, a brake therefor, driving mechanism for the sheet feeding mechanism and including a clutch, automatically operated means for moving a part of the clutch to disconnect said mechanisms and including a sheet caliper, devices between the brake and the clutch for rendering the brake ineffective, and manually operated means for moving the clutch part to connect said mechanisms, said last named means being adapted to reset the sheet caliper and actuate said devices for the purpose aforesaid.

11. In a sheet feeding apparatus, sheet feeding means, driving means therefor, a clutch for connecting and disconnecting the sheet feeding and driving means, a brake for the sheet feeding means, mechanism for engaging and disengaging the clutch parts, a movable member for rendering the brake effective and mounted adjacent the latter independently of the clutch, and means for operating said member comprising a rock shaft connected therewith, extending thereto from the clutch, and actuated by one clutch part when it is disengaged from the other clutch part by said mechanism.

12. In a sheet feeding apparatus, sheet feeding means, driving means therefor, a clutch for connecting and disconnecting the sheet feeding and driving means, a brake for the sheet feeding means, mechanism for engaging and disengaging the clutch parts, a movable member for rendering the brake effective and ineffective and mounted adjacent the latter independently of the clutch, means for actuating the member to render the brake effective and comprising a rock shaft connected with the movable member, extending thereto from the clutch, and actuated by one clutch part when it is disengaged from the other clutch part by said mechanism, and means for actuating the rock shaft and said movable member to render the brake ineffective when the clutch parts are engaged by said mechanism.

13. In apparatus of the character described, sheet feeding means, a brake therefor, means for driving the sheet feeding means including a clutch having parts engaged to connect said means and disengaged to disconnect the same, a rock shaft extending between the clutch and the brake, a device mounted adjacent the brake independently of the clutch and connected with and movable by the rock shaft in opposite directions to render the brake effective and ineffective, means adjacent the clutch for rocking the shaft and moving the device in one direction, said last named means being actuated by a part of the clutch when said parts are disengaged, and means for rocking said shaft and moving said device in the opposite direction when said parts are engaged.

JOHN H. McELROY.